GASEOUS ELECTRON TUBE CIRCUITS

Filed Oct. 29, 1948

INVENTOR
HUBERT H. WITTENBERG
BY Morris A. Robkin
ATTORNEY

Patented May 2, 1950 2,506,186

UNITED STATES PATENT OFFICE 2,506,186

GASEOUS ELECTRON TUBE CIRCUITS

Hubert H. Wittenberg, Lancaster, Pa., assignor to Radio Corporation of America, a corporation of Delaware Application October 29, 1948, Serial No. 57,362

7 Claims. (Cl. 315—350)

Figure 1:
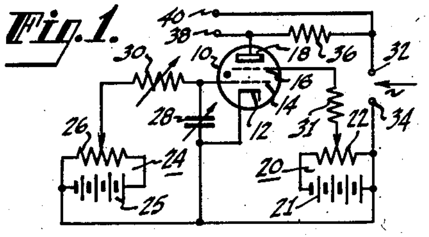

This invention relates to improvements in gaseous electron tube circuits, and finds application in periodic wave frequency dividing networks, variable frequency relaxation oscillators, and analogous systems.

It has previously been proposed to accomplish frequency division of a periodic electrical wave by utilizing the wave to charge a capacitor in a series of steps through a diode or other similiar rectifying device. The arrangement may be such that, after a predetermined number of cycles of the applied wave have been impressed on the circuit, the voltage across the capacitor becomes sufficient to unblock or "fire" a normally non-conducting electron tube device, such as a gaseous electron tube, a "start-stop" multivibrator, or the like, through which device the capacitor may then discharge rapidly to provide an output voltage pulse at a submultiple of the frequency of the applied wave. A system of this kind requires at least two tubes for each stage of frequency subdivision, and where several such stages are required, the number of tubes involved is correspondingly large. Moreover, where it is required to provide a variable factor of frequency subdivision, systems of the foregoing type do not always have the requisite flexibility.

A specialized application of frequency division is encountered in the synchronization or frequency control of relaxation oscillators. In a well known type of relaxation oscillator, a capacitor is connected in parallel with the plate circuit of a gaseous electron tube, and arranged to be charged at a predetermined rate through a control resistor to obtain a substantially linearly changing voltage across the resistor. When the voltage on the capacitor is sufficient to cause the gas tube to conduct current, the capacitor discharges rapidly through the tube, resulting in a sufficient drop in voltage to deenergize the tube, thus initiating a new cycle of operation. Since the plate voltage at which the gas tube will begin to conduct current is, in part, dependent on the grid voltage of the tube, such oscillators can be synchronized to operate at a submultiple of the frequency of a master control oscillator by supplying a synchronizing signal from the master oscillator to the grid of the relaxation oscillator tube. With the natural or "free-running" frequency of the relaxation oscillator adjusted to be near the desired submultiple of the frequency of the master oscillator, the signals from the master oscillator can be adjusted in amplitude until the relaxation oscillator will "lock in" at exactly the desired submultiple of the master oscillator frequency. However, the natural frequency of conventional relaxation oscillators cannot be changed by any large amount without altering the waveshape of the output voltage, and hence it is quite difficult to design a relaxation oscillator which can be synchronized at different frequencies without having undesirable changes in the waveshape of the output voltage.

It is, accordingly, a principal object of the present invention to provide improved, variable frequency, gaseous electron tube control systems.

Another object of the invention is to provide an improved frequency dividing system of the gaseous electron tube type.

A further object of the invention is to provide an improved, wide range, frequency dividing system requiring a minimum number of circuit elements.

Another object of the invention is to provide an improved relaxation oscillator having a readily variable operation period.

A further object of the invention is to provide an improved gaseous electron tube relaxation oscillator which is readily susceptible to synchronization at a submultiple frequency of a control signal.

According to the invention, the foregoing and other objects and advantages are attained by utilizing a tetrode or other multi-grid type of gaseous electron tube, with the biasing voltages for the tube so adjusted that the tube will draw control grid current during periods of anode current flow. Under these conditions, a capacitor connected between the cathode and the control grid of the tube can be charged and discharged through the control grid circuit of the tube to regulate the voltage at the control grid, and, as a result, the operational periods of the tube may be varied at will in any one of several different ways.

Figure 2:
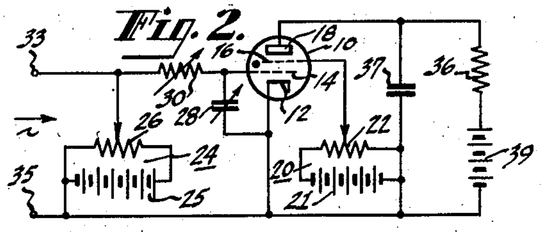
Figure 3:
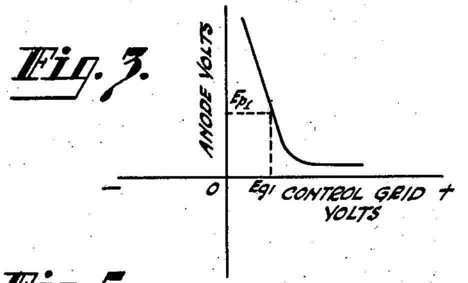
Figure 4:
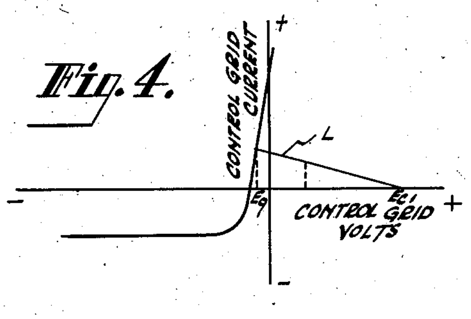
Figure 5:
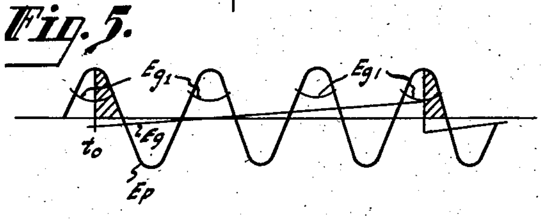
Figure 6:
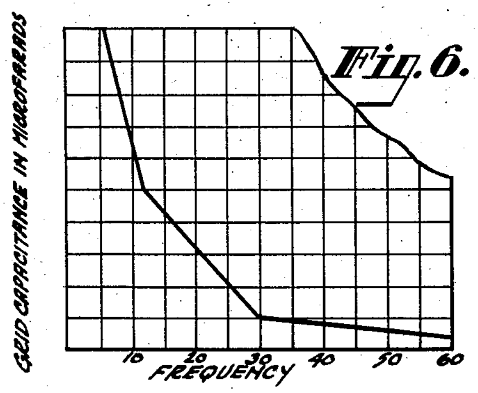
Figure 7:
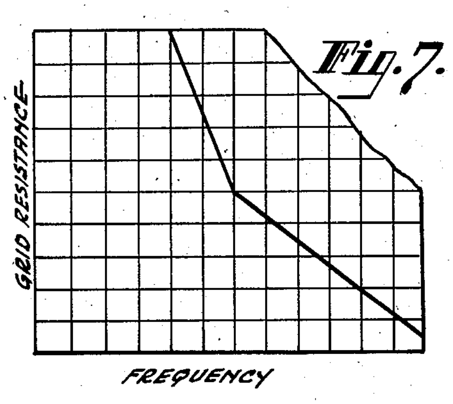
Figure 8:
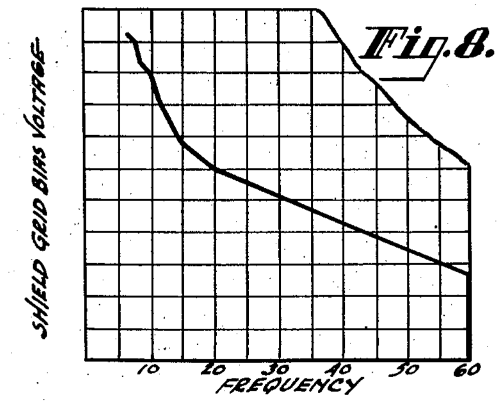
Figure 9:
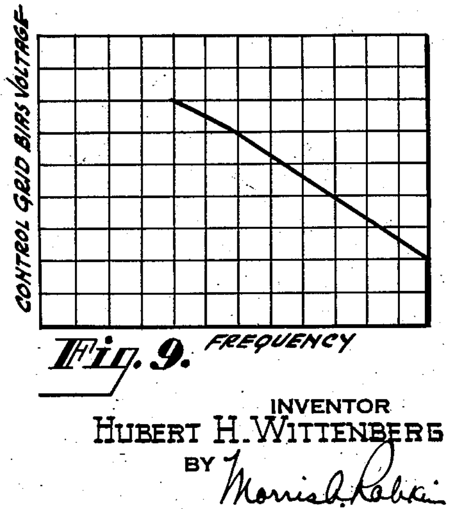

A more complete understanding of the invention may be had by reference to the following description of illustrative embodiments of the invention, when considered in connection with the accompanying drawing, in which:

Figure 1 is a circuit diagram showing a frequency dividing system arranged in accordance with the invention, Figure 2 is a circuit diagram of a relaxation oscillator, arranged in accordance with the invention, Figure 3 is a graph of one of the grid voltage-plate voltage characteristics of a typical gas tetrode tube, Figure 4 is a graph of one of the grid voltage-grid current characteristics of a typical gas tetrode tube, Figure 5 is a graphical representation of the operation of the circuit shown in Figure 1, Figure 6 is a graph showing the effect on output frequency of varying the shield grid voltage in the circuit of Figure 1, Figure 7 is a graph showing the effect on output frequency of varying the primary control grid voltage in the circuit of Figure 1, Figure 8 is a graph showing the effect on output frequency of varying the control-grid-to-cathode capacity in the circuit of Figure 1, and Figure 9 is a graph showing the effect on output frequency of varying the grid circuit resistance in the circuit of Figure 1.

Referring to the drawings, the invention will first be described as applied to an alternating current frequency dividing network, and accordingly, there is shown, in Figure 1, a frequency dividing system arranged in accordance with the invention. Such a system may include a multi-grid, gaseous, electron discharge tube, such as a tetrode 10, having a cathode 12, a control grid 14, a shield grid 16, and an anode 18. A source 20 of variable negative biasing voltage is provided for the shield grid 16, such as a battery 21 having a potentiometer 22 connected in parallel therewith, while a source 24 of variable positive biasing voltage is provided for the control grid 14, such as a second battery 25 having a potentiometer 26 connected in parallel therewith. A voltage control capacitor 28 is connected between the control grid 14 and the cathode 12 of the tube 10, and a capacitor charging control element, such as a resistor 30, is connected between the control grid 14 and the bias voltage source 24. While the element 30 has been shown as a resistor, it will be obvious that other impedance elements, through which the capacitor 28 can be charged, might be used in its place. The shield grid 16 may be connected to the bias source 20 through an isolating resistor 31. For convenience of discussion, the bias voltage sources for the tube 10 have been shown as individual sources 20 and 24, although it will be apparent that a single source of voltage could as well be used.

The anode circuit of the tube 10 is seen to include voltage input terminals 32, 34, through which an alternating voltage of any desired frequency may be applied to the system, and an output impedance, such as a resistor 36, across which a divided frequency output may be obtained at a pair of output terminals 38, 40.

The operation of the circuit of Figure 1 can best be explained by reference to Figures 3 through 9 of the accompanying drawing, in which Figures 3 and 4 show two of the characteristic curves for a typical gas tetrode tube of a type suitable for the circuit of Figure 1, while Figures 5 through 9 show certain of the operational characteristics of the circuit itself.

As was previously mentioned, the shield grid voltage obtained from the potentiometer 22 is made sufficiently negative with respect to the cathode so that a positive control grid voltage will be required to fire the tube 10. The relation between control grid voltage and anode voltage for a typical gas tetrode, operated with a negative shield grid voltage, is shown by the curve of Figure 3, wherein anode voltage is plotted as the ordinate against control grid voltage as the abscissa. As an example, it can be assumed that the maximum positive voltage which will be applied to the anode circuit of the tube 10, through the terminals 32, 34, is some predetermined $E_{p1}$ in the graph of Figure 3, and the corresponding grid voltage, at which the tube 10 will fire, will be some positive voltage $E_{g1}$. When the circuit of Fig. 1 is to be operated as a frequency divider, the control grid bias voltage from the source 24 will be adjusted to a value $E_{c1}$ substantially equal to or slightly greater than the critical voltage $E_{g1}$. Under these conditions, when a positive half cycle of voltage occurs at the input terminals 32, 34, the tube 10 will fire, and current will flow in the anode circuit of the tube 10. When anode current flows, the control grid 14 will also collect a current, the magnitude of which will be dependent, in part, on the voltage supplied to the control grid. This is shown in the graph of Figure 4, wherein control grid current is plotted against control grid voltage for one particular value of anode current, it being understood that the curve of Figure 4 is only one of a family of similar curves which might be plotted, each of which would represent a grid voltage-grid current characteristic for the tube 10 for a given value of anode current.

It will be appreciated that, in order to determine the actual voltage at the control grid 14 during grid current flow, a load line L must be drawn on the graph of Figure 4 to determine the effect of the particular grid resistor 30 which is being used. The load line will originate at the point of maximum grid supply voltage $E_{c1}$, and will have a slope determined by the magnitude of the grid resistor used. The intersection of the load line L with the characteristic grid voltage-grid current curve will give the actual grid voltage and grid current for the tube 10 under operating conditions. From Figure 4, it will be seen that the actual voltage $E_g$ at the control grid 14 of the tube 10 during grid current flow will be considerably less than the critical grid voltage $E_{g1}$ which is necessary to fire the tube under the assumed conditions, and hence the voltage on the capacitor 28 must decrease to correspond with the new voltage obtaining at the control grid. The flow of grid current in the tube 10 will be effective to discharge the grid capacitor 28 from the voltage $E_{g1}$, which existed at the grid of the tube prior to firing thereof, to a voltage equal to the actual control grid voltage $E_g$ on the tube during anode and grid current flow.

As the input voltage at the terminals 32, 34 of the circuit of Figure 1 changes from a positive to a negative value, the tube 10 will cease to draw current, and the capacitor 28 will begin to charge from the bias source 24 through the resistor 30. However, this flow of charging current through the resistor 30 will hold the voltage $E_g$ at the control grid 14 below the critical voltage $E_{g1}$ for a time determined by the time constant of the resistor 30 and the capacitor 28. Hence, on the next positive half cycle of anode voltage, the tube cannot conduct current because the control grid voltage $E_g$ will be below the critical value $E_{g1}$ indicated in Figure 3.

This action is more clearly illustrated in the operational graph of Figure 5, in which the curve $E_p$ represents several cycles of alternating voltage such as might be applied to the circuit of Figure 1 through the terminals 32, 34, the curves $E_{g1}$ represent the critical grid voltage required to fire the tube 10 during each positive cycle of anode voltage for a given negative shield grid voltage, and the line $E_g$ represents the actual voltage at the grid of the tube 10. In Figure 5, it may be assumed that, at some time "$t_0$" during the first positive half cycle of alternating voltage shown, the capacitor 28 will become sufficiently charged to permit the tube 10 to fire, and, consequently, to draw anode and grid current in the manner previously described. As shown by the control grid voltage line $E_g$ in Figure 5, when the tube 10 fires at the time $t_0$, the control grid voltage will drop from the critical value $E_{g1}$ to the value determined from the intersection of the load line L with the characteristic curve in Figure 4.

During the next two positive half cycles of input voltage $E_p$, the grid voltage $E_g$ remains below the critical level $E_{g1}$ due to charging of the capacitor 28. In the example illustrated by Figure 5, on the fourth positive half cycle of input voltage, the capacitor 28 becomes sufficiently charged to permit the tube to fire again. It will be understood that, when the tube 10 fires, a pulse of voltage will be developed across the output resistor 36, and in the example shown, the frequency of this output pulse will be one-third of the frequency of the input voltage.

The frequency of the signal available at the terminals 38, 40 of Figure 1 can be controlled by varying the control grid resistor 30, the control grid capacitor 28, the shield grid bias voltage from the potentiometer 22, or the control grid bias voltage from the potentiometer 26. Variations of either the capacitor 28 or the resistor 30 vary the time constant of the resistor-capacitor combination 30—28, and, consequently, the rate-of-rise of the exponential grid voltage curve $E_g$ of Figure 5. In Figure 6 of the drawing, in which grid-to-cathode capacity is plotted as the ordinate against output frequency as the abscissa, there is shown the variation in the output frequency which can be obtained by varying the capacitor 28 in a typical circuit arranged as shown in Figure 1. Figure 7 shows the analogous effect on output frequency of variation of the resistor 30 in Figure 1.

The effect on the output frequency which can be obtained by varying the shield grid and the control grid bias voltages in a typical case, is shown in Figures 8 and 9, respectively. Making the shield grid bias voltage more negative raises the critical control grid voltage required to fire the tube 10 for a given value of anode voltage, and hence lowers the output frequency. This is illustrated in Figure 8, wherein the shield grid bias voltage is plotted as the ordinate against the output frequency as the abscissa. As seen in Figure 8, if the shield grid bias is made sufficiently negative, no output will be obtained at the terminals 38, 40. As the shield grid bias voltage approaches zero, the critical grid voltage $E_{g1}$ also approaches zero, and if the shield grid bias voltage is made sufficiently negative, output pulses will be available at terminals 38, 40 for every cycle of applied anode voltage.

In the graph of Figure 9, wherein control grid bias voltage is plotted as the ordinate against output frequency as the abscissa, the effect of variations in control grid bias voltage on the output frequency of the system is shown. As is indicated in Figure 9, for a given value of shield grid voltage, the frequency of the output will be decreased by making the control grid bias supply voltage less positive.

As was previously mentioned, the principles of the invention are applicable to synchronization and/or frequency control of a relaxation oscillator, and accordingly, in Figure 2 of the drawing, there is shown an illustrative arrangement of one such embodiment of the invention. The shield grid and the control grid circuits for the system of Figure 2 are similar to those which have already been described for the circuit of Figure 1, with the exception that a pair of input terminals 33, 35 may be provided in the grid circuit, as shown, through which a synchronizing signal may be applied to the system if desired. The anode circuit of the tube 10 is provided with a capacitor 37 connected between the anode and the cathode of the tube, and a D. C. supply voltage source, illustrated as a battery 39, is provided for charging the capacitor 37 through an output resistor 36.

The operation of the circuit of Figure 2 will be similar in many respects to that of the circuit of Figure 1. In this case, however, the periodically varying anode voltage for the tube 10 will be obtained from the periodic charge and discharge of the capacitor 37. As is the usual case with so-called relaxation oscillators, the capacitor 37 will be charged from the battery 39 through the resistor 36 at a rate depending on the voltage of the battery 39 and the time constant of the resistor-capacitor combination which comprises the resistor 36 and the capacitor 37.

In the circuit of Figure 2, when the voltage across the capacitor 37 has reached a predetermined value, (corresponding to the maximum positive voltage $E_{p1}$ applied to the anode in the circuit of Figure 1), the tube 10 will fire provided the proper critical voltage exists at the control grid 14 of the tube. However, as was explained, the control grid voltage is dependent on the condition of the capacitor 28 at any one instant, and accordingly, if the time constant of the anode circuit is less than that of the grid circuit, the frequency of oscillation will be controlled by the grid circuit. When the voltage on the capacitor 28 reaches the critical level necessary to fire the tube 10 for a given voltage across the capacitor 37, the capacitor 37 will discharge through the anode circuit of the tube 10, while the capacitor 28 will discharge through the grid circuit as was previously described. The discharge of the capacitor 37 will cause the anode voltage of the tube 10 to drop sufficiently to extinguish the anode current, whereupon the charging of the capacitors 28 and 37 will again take place in the obvious manner. If desired, the relaxation oscillator shown in Figure 2 may be permitted to operate at some natural frequency selected by adjusting the shield grid bias voltage, the control grid bias voltage, the resistor 30, the capacitor 28, or it may be synchronized to operate at a submultiple of the frequency of a signal applied through the terminals 33, 35 to the grid circuit of the tube. In the latter case, the frequency of the periodic voltage wave at the output terminals may be set to any of the elements 22, 26, 28 or 30 of the circuit. Since the natural frequency of the relaxation oscillator circuit shown in Figure 2 can be varied in any one of four different ways, without altering any of the plate circuit parameters, it is apparent that synchronization of the oscillator at a submultiple of any one of a wide range of input frequencies can readily be affected without adversely affecting the wave shape of the output signal from the oscillator.

Since many changes could be made in the circuits shown and described, all within the scope and spirit of the invention, the foregoing is to be construed as illustrative and not in a limiting sense.

What is claimed is:

1. A gaseous electron tube circuit comprising a gaseous electron tube having an anode, a cathode, a shield grid, and a control grid and including a control grid circuit for said tube, means for maintaining said shield grid at a predetermined negative potential relative to said cathode, said control grid circuit comprising (1) a source of voltage positive with respect to said cathode, (2) a capacitor connected between said control grid and said cathode, and (3) a continuously conducting capacitor charging control element connected between said source and said control grid, and means for applying a periodically varying voltage to said tube between said anode and said cathode.

2. A circuit as defined in claim 1 wherein said element comprises a resistor.

3. A gaseous electron tube control network adapted for use with a multi-grid gaseous electron tube, said network comprising an anode circuit, a cathode circuit, and a plurality of grid circuits, means for supplying a periodically varying voltage to said network through said anode and cathode circuits, means for maintaining one of said grid circuits at a predetermined negative potential relative to said cathode circuit, means including a voltage source for applying a biasing voltage positive with respect to said cathode to another one of said grid circuits, a capacitor connected between said another grid circuit and said cathode circuit, a continuously conducting impedance connected in circuit between said capacitor and said voltage source, and circuit means including said last named means for charging said capacitor through said impedance.

4. A gaseous electron tube circuit comprising a gaseous electron tube having an anode, a cathode, a shield grid, and a control grid and including a control grid circuit for said tube, means for maintaining said shield grid at a predetermined negative potential relative to said cathode, said control grid circuit comprising (1) a source of voltage positive with respect to said control grid and said cathode, (2) a capacitor connected between said control grid and said cathode, and (3) a continuously conducting capacitor charging control element connected between said source and said control grid, an output circuit for said tube comprising an impedance connected to said anode, and means for supplying a periodically varying voltage to said tube through said impedance.

5. A circuit as defined in claim 4 wherein said element comprises a resistor.

6. A gaseous electron tube circuit comprising a gaseous electron tube having an anode, a cathode, a shield grid, and a control grid and including a control grid circuit for said tube and an anode circuit for said tube, means for maintaining said shield grid at a predetermined negative potential relative to said cathode, said control grid circuit comprising, (1) a source of voltage positive with respect to said cathode, (2) a capacitor connected between said control grid and said cathode, and (3) a capacitor charging control element connected between said source and said control grid, said anode circuit comprising (1) a capacitor connected between said anode and said cathode, (2) a source of voltage, and (3) an impedance, said last named source and said impedance being serially connected between said anode and said cathode.

7. A circuit as claimed in claim 6 wherein said element comprises a resistor and wherein said impedance comprises a resistor.

HUBERT H. WITTENBERG.

REFERENCES CITED

The following references are of record in the file of this patent:

UNITED STATES PATENTS

| Number | Name | Date |
|---|---|---|
| 2,174,386 | King | Sept. 26, 1939 |
| 2,331,771 | Germeshausen et al. | Oct. 12, 1943 |
| 2,442,256 | Bartlett | May 25, 1948 |
| 2,450,460 | Thomson | Oct. 5, 1948 |